June 1, 1954  I. V. ZOZULIN ET AL  2,680,203
PERMANENT MAGNETIC CLUTCH
Filed April 12, 1952
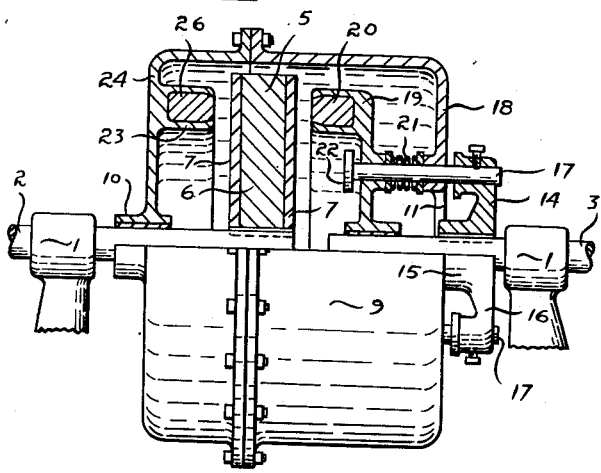
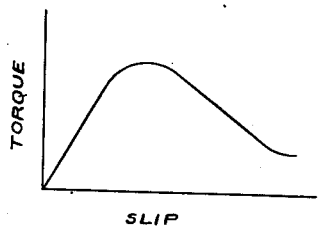
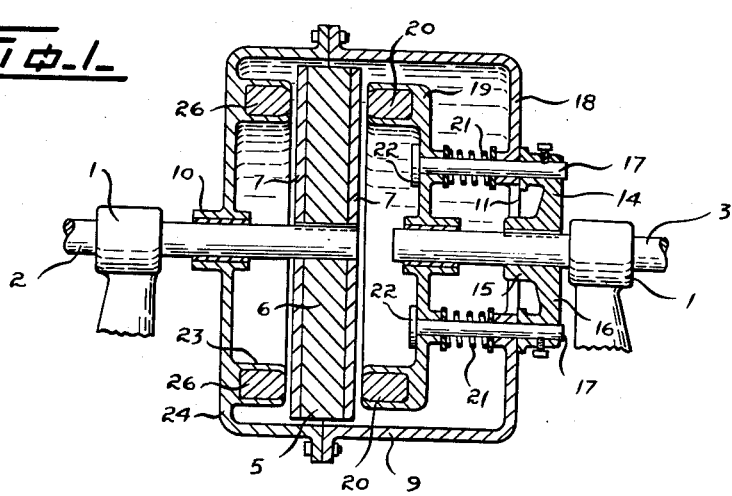
INVENTORS
IGOR V. ZOZULIN
GEORGE J. OKULITCH
GEORGE M. VOLKOFF
VLADIMIR J. OKULITCH
ALEC SYDNEY JOHN ELLETT
PATENT ATTORNEY Patented June 1, 1954

2,680,203

UNITED STATES PATENT OFFICE 2,680,203

PERMANENT MAGNETIC CLUTCH

Igor V. Zozulin, George J. Okulitch, George M. Volkoff, Vladimir J. Okulitch, and Alec S. J. Ellett, Vancouver, British Columbia, Canada Application April 12, 1952, Serial No. 282,073

2 Claims. (Cl. 310—94)

Our invention relates to improvements in permanent magnetic clutches with overload protection.

The object of the present invention is to provide a non-positive drive clutch which is of particular value in preventing damage to the driving motor through overloading. A further object is to provide a clutch which is automatic in operation and one which can be adjusted to develop a constant speed characteristic independently of the load applied. A still further object is to design a clutch of this type which is fully enclosed and will alter the distance of separation between magnetic elements in a predetermined manner with the changes in the transmitted torque.

Referring to the accompanying drawings:

Figure 1 is a longitudinal sectional view of the invention with the several parts in normal position of no load.

Figure 2 is a part elevational view of the invention with the elements disposed to show the parts at maximum torque position, and about to let the torque drop to zero and allow the load to come to rest.

Figure 3 is a diagram showing the general torque characteristics of the device when using a trimetallic rotor.

In the drawings like characters of reference indicate corresponding parts in each figure.

The numeral 1 indicates a pair of spaced bearings in which are journalled an input shaft 2 and an aligned output shaft 3. At the inner end of the shaft 2 a rotor 5 is secured, which rotor consists of an inner member 6 of soft iron or any other metal of high magnetic permeability provided with sides or plates 7 of copper or other metal of high electrical conductivity.

A cylindrical casing 9 is freely journalled at one end as at 10 upon the shaft 2 and is provided with an opening 11 at its opposite end, which is concentric to the shaft 3.

A flange 14 having a hub 15 forms a closure 16 for the opening 11 and is keyed to the output shaft 3. The flange 14 is fitted with circumferentially spaced rods 17 which extend through the casing end wall 18 and project parallel to the shaft 3 towards the trimetallic rotor 5. Slidably fitted on the rods 17 and upon the shaft 3 is a rotor 19 having an annular ring of permanent horseshoe magnets 20 which are resiliently held to within a predetermined spacing from the trimetallic rotor 5 by compression springs 21. The maximum spacing or gap between the magnets and the trimetallic rotor is limited by the heads 22 on the rods 17. Another magnetic rotor 23 is formed by providing the end wall 24 of the casing 9 with an annular ring of permanent horseshoe magnets 26, which, as in the case of the magnets 20, are resiliently held to a minimum spacing from the face of the trimetallic rotor 5 so as to provide suitable air gaps between the magnets and the iron armature formed by the rotor 5.

In operation, when rotation is imparted to the input shaft, the eddy currents set up between the poles of each magnet and the member 6 will cause the rotors 19 and 23 to rotate substantially in unison with the shaft 2 and when a load is applied to the shaft 3 a slip will occur between the rotor 5 and the rotors 19 and 23, which latter rotate in unison, since both are carried by the end walls 18 and 24 respectively. As slip between the drive rotor 5 and driven rotors 19 and 23 increases, so will repulsion be set up between them, thus causing a progressively increasing separation or widening of the air gaps and consequently a limitation of the torque, which will obviously be accompanied by the endwise movement of the casing 9 to the left of Figure 1 and the endwise movement of the rotor 19 to the right. When the load on shaft 3 reaches a predetermined maximum torque, or the point at which the input motor would become overloaded, the separation will become of such magnitude that the torque will start to drop as indicated in the diagram shown in Figure 3 and will continue until the drag of the load will bring the shaft 3 to rest.

It is known that with a structure using a magnetic rotor to rotate a copper rotor, or vice versa, the torque will rise as the slip increases, but where a magnetic rotor such as here described is rotated by a trimetallic rotor the torque passes through a maximum at a certain slip and then drops off as the slip increases therebeyond, as indicated in the diagram Figure 3, consequently a structure of this type designed to be driven say by an electric motor of given capacity will start to lose its torque as the load increases beyond the normal capacity of the motor, thereby providing the motor with a satisfactory and automatic overload cut-out or preventor.

Obviously if only one magnetic rotor is used in place of the two hereinbefore described, then the rotor 5 would be bimetallic and not trimetallic.

What we claim as our invention:

1. A magnetic clutch adapted for mounting upon an input and an output shaft, a rotor secured upon one of said shafts, said rotor being of laminated construction with one plate of a metal of high magnetic permeability and outside plates of high electrical conductivity, a member mounted upon the other shaft, a second annular rotor having a ring of spaced permanent magnets facing the first mentioned rotor, means for slidably and non-rotatably mounting the second named rotor upon the member, a third rotor having a ring of spaced permanent magnets freely rotatable about the first mentioned shaft and facing the first named rotor, means for connecting the magnet equipped rotors together for sliding movement towards and away from the first named rotor, and spring means for urging the magnet equipped rotors towards the first named rotor.

2. A magnetic clutch adapted for mounting upon an input and an output shaft, a rotor secured upon one of said shafts, said rotor being of laminated construction with one plate of a metal of high magnetic permeability and outside plates of high electrical conductivity, a member mounted upon the other shaft, a casing enclosing the clutch parts, said casing having end walls, means carried by the member extending inwardly into the casing, one of said end walls being mounted upon said means for sliding movement therealong, a rotor having an annulus of permanent magnets slidable upon said means, spring means urging the said casing end wall from the magnet equipped rotor, a second annulus of permanent magnets supported within the casing upon the second end wall opposite to said first named annulus and facing the opposite side of the first named rotor, said second end wall and its annulus of permanent magnets being urged towards the laminated rotor by said spring means.

References Cited in the file of this patent

UNITED STATES PATENTS

| Number | Name | Date |
|---|---|---|
| 1,415,079 | Wood | May 9, 1922 |
| 1,862,267 | Honig | June 7, 1932 |
| 1,902,471 | Thomson | Mar. 21, 1933 |
| 2,193,214 | Winther | Mar. 12, 1940 |
| 2,428,634 | Nordstrum | Oct. 7, 1949 |
| 2,550,861 | Ransom | May 1, 1951 |
| 2,632,859 | Bessiere | Mar. 24, 1953 |